United States Patent
Münz et al.

(10) Patent No.: US 11,113,437 B2
(45) Date of Patent: Sep. 7, 2021

(54) JOINT HARDWARE AND CONTROLLER DESIGN

(71) Applicant: Siemens Aktiengesellschaft, Munich (DE)

(72) Inventors: Ulrich Münz, Plainsboro, NJ (US); Edward Slavin, III, Robbinsville, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 253 days.

(21) Appl. No.: 16/086,089

(22) PCT Filed: Sep. 30, 2017

(86) PCT No.: PCT/US2017/054666
§ 371 (c)(1),
(2) Date: Sep. 18, 2018

(87) PCT Pub. No.: WO2019/066983
PCT Pub. Date: Apr. 4, 2019

(65) Prior Publication Data
US 2020/0302096 A1   Sep. 24, 2020

(51) Int. Cl.
*G06F 30/23* (2020.01)
*G06F 30/12* (2020.01)
*G06F 111/06* (2020.01)

(52) U.S. Cl.
CPC .............. *G06F 30/23* (2020.01); *G06F 30/12* (2020.01); *G06F 2111/06* (2020.01)

(58) Field of Classification Search
CPC ...... G06F 30/23; G06F 30/12; G06F 2111/06; G06F 30/20
See application file for complete search history.

(56) References Cited

U.S. PATENT DOCUMENTS

| | | | | |
|---|---|---|---|---|
| 6,084,595 A | * | 7/2000 | Bach | G06F 16/5838 345/589 |
| 6,801,881 B1 | * | 10/2004 | Shah | G05B 17/02 700/105 |
| 9,002,682 B2 | * | 4/2015 | Kasabov | G06N 20/00 703/2 |

(Continued)

OTHER PUBLICATIONS

Shaoluo L. Butler et al: "Integrated Structure Decomposition, Optimization and Control Design", vol. 6: 33rd Design Automation Conference, Parts A and B, Sep. 7, 2007 (Sep. 7, 2007), pp. 731-738, XP055459503, / Jul. 9, 2007.

(Continued)

*Primary Examiner* — Michael Roswell (57) ABSTRACT

A method for designing a product comprising physical hardware and a controller for controlling the physical hardware includes generating a detailed hardware model describing the physical hardware and a controller model corresponding to the controller based on a set of user requirements. An optimal design of the physical hardware and the controller is determined by solving a multi-objective optimization problem comprising a first objective function defining hardware design objectives, and a second objective function defining objectives for the controller model for the physical hardware.

9 Claims, 3 Drawing Sheets

(56) References Cited

U.S. PATENT DOCUMENTS

| | | | | |
|---|---|---|---|---|
| 2006/0025973 A1* | 2/2006 | Kim | ............... | G05B 17/02 703/2 |
| 2006/0122726 A1* | 6/2006 | Bergstrom | ............... | G06F 30/15 700/182 |
| 2006/0277010 A1* | 12/2006 | Schutte | ............... | G05B 17/02 703/8 |
| 2007/0244676 A1* | 10/2007 | Shang | ............... | G06F 30/23 703/2 |
| 2009/0119031 A1* | 5/2009 | Niwa | ............... | B21D 22/02 702/43 |
| 2010/0179794 A1* | 7/2010 | Shah | ............... | G06Q 10/06 703/6 |
| 2012/0036138 A1* | 2/2012 | Carrion | ............... | G06F 30/327 707/748 |
| 2012/0323538 A1* | 12/2012 | Rassaian | ............... | G06F 30/15 703/2 |
| 2013/0096708 A1* | 4/2013 | Danks | ............... | B29C 64/386 700/98 |
| 2014/0180644 A1* | 6/2014 | Maturana | ............... | G05B 17/02 703/1 |
| 2015/0120261 A1* | 4/2015 | Giannacopoulos | ............... | G06F 30/23 703/2 |
| 2015/0134317 A1* | 5/2015 | Maturana | ............... | G06F 30/20 703/13 |
| 2016/0147920 A1* | 5/2016 | Goulkhah | ............... | G06F 30/20 703/21 |

OTHER PUBLICATIONS

Yee-Pien Yang et al: "Multiobjective optimization of hard disk suspension assemblies: Part II—integrated structure and control design", Computers and Structures., vol. 59, No. 4, May 1, 1996 (May 1, 1996), pp. 771-782, XP055459973, GB / May 1, 1996.

PCT International Search Report and Written Opinion of International Searching Authority dated Jul. 31, 2018 corresponding to PCT International Application No. PCT/US2017/054666 filed Sep. 30, 2017.

Zhiwei Feng et al.: "Control-structure integrated multiobjective design for flexible spacecraft using MOEA/D", Structural and Multidisciplinary Optimization, vol. 50, No. 2, Feb. 27, 2014 (Feb. 27, 2014), pp. 347-362, XP055460743.

* cited by examiner

JOINT HARDWARE AND CONTROLLER DESIGN

TECHNICAL FIELD

The present invention relates generally to methods, systems, and apparatuses for the generating product designs by jointly optimizing a product's hardware and controllers to satisfy user requirements. The technology described herein may be applied, for example, to various integrated product design, engineering and manufacturing tools and other produce lifecycle management applications.

BACKGROUND

Complex systems such aircraft typically include physical hardware and one or more controllers for controlling the physical hardware. With conventional techniques, complex systems are designed in two steps that are performed in serial. First, the hardware is designed. To continue with the aircraft example, the initial design process may include designing the size and structure of the wings of the aircraft as well as the location of the aircraft's turbines. In order to optimize the hardware design, special optimization techniques can be applied to achieve that the aircraft is light, highly dynamic, and structurally stable. Once the hardware design is complete, the controllers for the aircraft are designed. In order to optimize the controller, the aircraft model is simplified using standard model-order reduction techniques. Then, standard controller optimization techniques like H-infinity optimization can be used to obtain a good flight performance of the aircraft. Flight performance means in this setup stable flight and fast reaction to commands from the pilot even in extreme maneuvers.

Because the two design steps are performed in serial, optimization cannot be applied to the system as a whole. For example, optimization of the hardware design does not leverage feedback from the controller design. Hence, a tradeoff between "simple" hardware design (usually requiring complex controller design) and a "simple" controller design (usually requiring a complex hardware design) is not possible. For example, if the resulting flight performance of the aircraft is not satisfactory—even for the best available controller—a complete redesign of the hardware is required. This redesign can be very time consuming and requires expert knowledge on how to change the hardware design such that the flight performance is eventually achieved.

SUMMARY

Embodiments of the present invention address and overcome one or more of the above shortcomings and drawbacks by providing methods, systems, and apparatuses related to the generation of product designs that jointly optimize a system's hardware and related controllers to satisfy user requirements.

According to some embodiments, a method for designing a product comprising physical hardware and a controller for controlling the physical hardware includes generating a detailed hardware model describing the physical hardware (e.g., a finite element model of the physical hardware) and a controller model corresponding to the controller based on a set of user requirements. An optimal design of the physical hardware and the controller is determined by solving a multi-objective optimization problem comprising a first objective function defining hardware design objectives, and a second objective function defining objectives for the controller model for the physical hardware.

In some embodiments of the aforementioned method, the multi-objective optimization problem further comprises a third objective function that minimizes the differences between a reduced order model of the detailed hardware model and the detailed hardware model. This reduced order model may then be used by the second objective function to define the objectives for the controller model for the physical hardware. The reduced order model of the detailed hardware model may be, for example, a low-order linear model obtained through reduction of the finite element model of the physical hardware. An optimization of the reduced order model is used in some embodiments to minimize an error between the detailed hardware model and the reduced order model. In some embodiments, the multi-objective optimization problem is a weighted sum of the first objective function, the second objective function, and the third objective function. For example, in one embodiment, the weighted sum applies a distinct weight value to each objective function as determined based at least in part on the set of user requirements.

In some embodiments, the aforementioned method further comprises determining an ideal solution to the first objective function and an ideal solution to the second objective function by optimizing each objective function independently. The multi-objective optimization problem may then be solved using a weighted distance metric for each objective function comparing any potential solution to the ideal solution for the objective function.

Once the optimal design of the physical hardware and the controller is determined, it may be used to perform additional design or manufacturing activities. For example, in one embodiment, the method discussed above further comprises generating a set of instructions for printing one or more components of the optimal design on a 3D printer. Then, the components can be printed using the instructions. In other embodiments, the controller model is automatically into controller code executable on one or more microcontrollers.

According to another aspect of the present invention, as described in some embodiments of present invention, a system for designing a product comprising physical hardware and a controller for controlling the physical hardware includes a computer-readable medium, a receiver module, and an optimization module. The computer-readable medium comprises a detailed hardware model corresponding to the physical hardware and a controller model corresponding to the controller. The receiver module is configured to receive one or more user requirements via a user input device. The optimization module is configured to jointly optimize the detailed hardware model and the controller model over a plurality of iterations. Each iteration includes (i) optimizing of the detailed hardware model with respect to the one or more user requirements; (ii) matching the detailed hardware model to a reduced order model; and (iii) optimizing the controller model with respect to the reduced order model.

The optimization module can be implementing using techniques that are similar to the methods discussed above. For example, in one embodiment, optimization module jointly optimizes the detailed hardware model and the controller model by solving a multi-objective optimization problem. This problem includes a first objective function defining hardware design objectives, a second objective function defining objectives for the controller model for the physical hardware, and a third objective function that minimizes the differences between the reduced order model of the detailed hardware model and the detailed hardware model Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawing exemplary embodiments that are presently preferred, it being understood, however, that the invention is not limited to the specific instrumentalities disclosed. Included in the drawings are the following Figures.

DETAILED DESCRIPTION

The following disclosure describes the present invention according to several embodiments directed at methods, systems, and apparatuses related to joint hardware and controller design. More specifically, the technology described herein addresses the generation of designs that jointly optimize a system's hardware and controllers to satisfy user requirements. The steadily increasing desire for shorter development cycles combined with more challenging requirements on systems needs fast and optimal co-design of hardware components and their controllers. As a recurring example, the technology is described herein with reference to a tactical aircraft for illustration purpose. Tactical aircrafts are particularly interesting because they are structurally unstable and require specialized controllers to stabilize the aircraft. However, it should be understood that the techniques can be generally applied to any type of system comprising hardware components and controllers (e.g., wind turbines, electrical drives, etc.).

Figure 1:
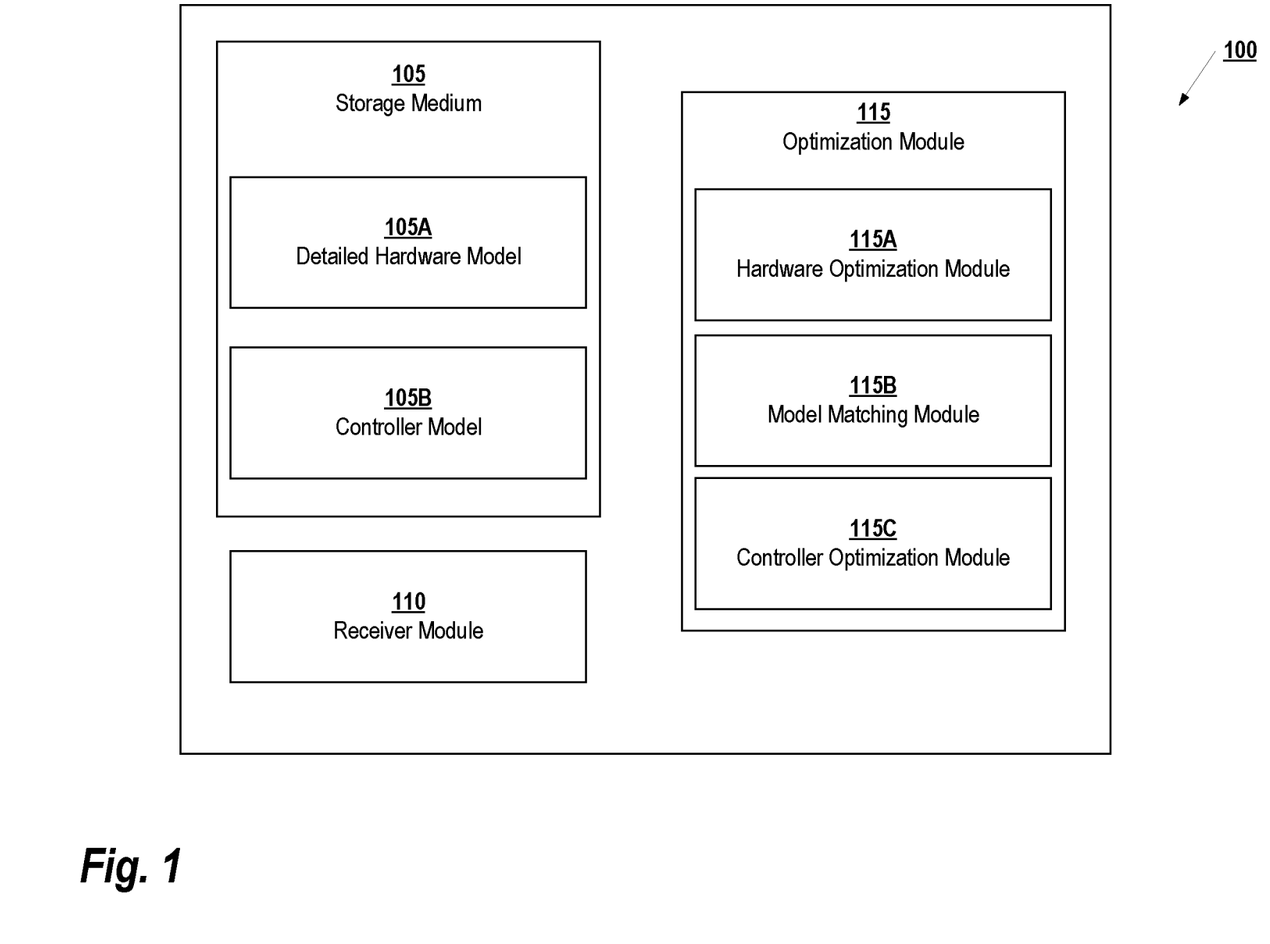
FIG. 1 illustrates a system for designing a product, according to some embodiments.

FIG. 1 illustrates a system 100 for designing a product, according to some embodiments. This system 100 may be implemented as a standalone system or, in some embodiments, the system 100 may be embedded in a design generation tool. As is generally understood in the art, a design generation tool is a software package used to model, analyze and predict the performance of various product designs. Such a design generation tool may generally be implemented on any computing architecture known in the art. However, due the computational complexity of modeling and analysis algorithms typically used for design generation, a multi-processor-based computing environment is used in some embodiments to allow for fast execution over the overall design process.

For the system 100 shown in FIG. 1, the system is assumed to be a complex system comprising physical hardware and one or more controllers. For example, consider the design of a quad-copter that is intended to carry packages. This provides a simplified implementation of an aircraft. A user requirement may specify that the quad-copter must carry packages up to a certain weight. Thus, the quad-copter must have a certain thrust to move it upward. If the hardware design is optimized based on this requirement, it may result in a very light mechanical design. At this point, a controller model will be used to design a controller that supports the mechanical design and meets the customer's requirements. For example, a user requirement may specify that the quad-copter must be able to deliver packages with a certain precision. However, if the controller is only designed after the mechanical design is finalized; it may be found that the mechanical design is too difficult to control without an expensive controller. At this point, with conventional systems, the hardware design would need to be adjusted and the process would begin again. This could require many iterations of the hardware design followed by the controller design, and it may still not end up with the optimal overall design. To address these deficiencies, the system 100 jointly optimizes the hardware and controller design.

The system comprises a computer-readable storage medium 105 comprising a detailed hardware model 105A and a controller model 105B. The detailed hardware model 105A describes various characteristics of the mechanical design of the product. Various types of hardware models generally known in the art may be used as the detailed hardware model 105A. For example, in one embodiment, the detailed hardware model 105A is a finite-element model (FEM) of the (fluid-)mechanical design of the product. The controller model 105B describes the controller of the system. As with the detailed hardware model 105A, controller models generally known in the art may be used as the controller model 105B.

The controller model 105B is interconnected with a reduced model of the detailed hardware model 105A that is suitable for controller design. As is generally understood in the art, model reduction techniques approximate complex high-order models by generating reduced order models that are adequate for analysis of the system. For example, in some embodiments, the reduced model is a low order linear model. Various types of reduced models generally known in the art may be used in conjunction with the techniques described herein. In some embodiments, the model reduction process allows the user to indicate the essential features of the system that need to be captured in the reduced model.

In embodiments where the system 100 is integrated into a design generation tool, the design may be automatically generated from customer requirements. In these embodiments, the detailed hardware model 105A and the controller model 105B may be generated automatically by the tool (e.g. using knowledge about the models that were used in previous projects for similar customer requirements).

A receiver module 110 configured to receive one or more user requirements related to the product design. The user may provide these requirements, for example, using a user input device such as a keyboard, tablet screen, etc. In embodiments where the system 100 is embedded within a design generation tool, the receiver module 110 serves as the interface to other software components of the tool. Thus, the receiver module 110 may be implemented as an application program interface (API) for interacting with the other components. Aside from just receiving the data, the receiver module 110 may also perform any pre-processing on the data that may be necessary (e.g., formatting or translating requirements data). In embodiments where the receiver module 110 is implemented in a standalone device, the receiver module 110 may include additional functionality for interfacing with the user input device or a storage device to retrieve the user requirements.

Continuing with reference to FIG. 1, an optimization module 115 configured to jointly optimize the detailed hardware model and the controller model over a plurality of iterations. During each iteration, at least three operations are performed: optimization of the detailed hardware model with respect to the one or more user requirements; matching of the detailed hardware model to a reduced order model; and optimization the controller model with respect to the reduced order model. It should be noted that this general framework may be modified or enhanced in different embodiments, depending on the availability of different models or datasets For example, if the hardware and simulation tools are available the reduced order model may be replaced with a highly detail real model of the system of interest.

To facilitate the joint optimization operations, the optimization module 115 includes a hardware optimization module 115A, a model matching module 115B, and a controller optimization module 115C. The hardware optimization module 115A optimizes the detailed hardware model 105A with respect to hardware requirements included in the customer requirements (e.g., weight, structural stability, etc.). The model matching module 115B matches the detailed hardware model 105A to the reduced order model using a technique such as H-infinity optimization of the reduced order model to minimize the error between the detailed hardware model 105A and the reduced order model. The controller optimization module 115C optimizes the controller model 105B for a given reduced order model (e.g., with respect to the flight performance of the aircraft). Within the optimization module 115, the hardware optimization module 115A, the model matching module 115B, and the controller optimization module 115C are interconnected such that both the product's hardware and controller are optimized in a single step. One technique for performing the joint optimization is described below with respect to FIG. 2.

Figure 2:
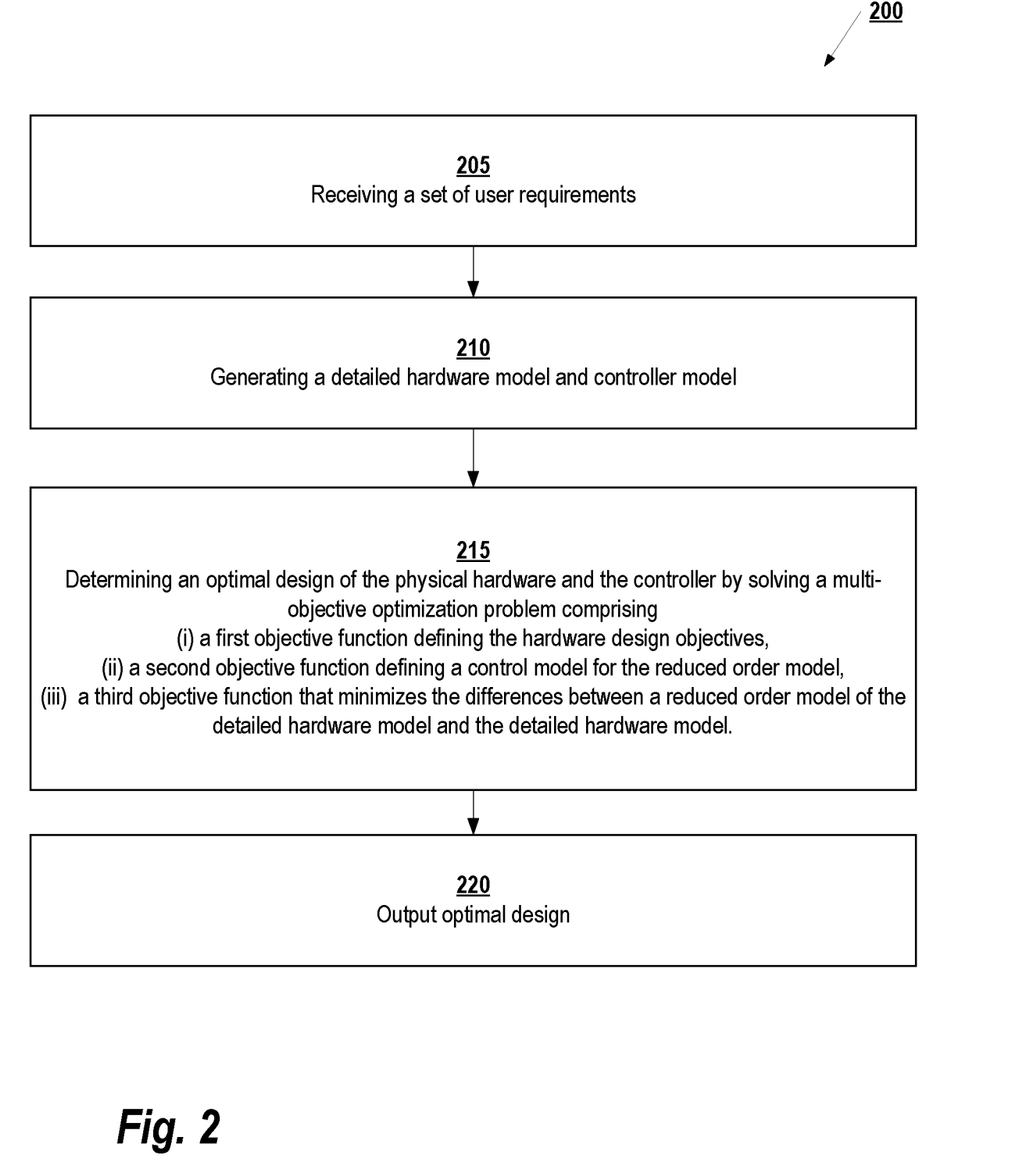
FIG. 2 illustrates a method for designing a product comprising physical hardware and a controller for controlling the physical hardware, according to some embodiments.

FIG. 2 illustrates a method for designing a product comprising physical hardware and a controller for controlling the physical hardware, according to some embodiments. Starting at step 205, a set of user requirements is received, for example, via user input into a graphical user interface (GUI). At step 210, a detailed hardware model and a controller model are generated based on a set of user requirements. As noted above, in some embodiments, the detailed hardware model is a finite element model of the physical hardware.

At step 215, an optimal design of the physical hardware and the controller is determined by solving a multi-objective optimization problem comprising three objective functions. The first objective function defines the hardware design objectives such as weight and structural stiffness. The second objective function included in the multi-objective optimization problem defines controller objectives for the reduced order model, for example, based on H-infinity optimization or linear quadratic regulation (LQR). The third objective function minimizes the differences between the reduced order model of the detailed hardware model and the detailed hardware model. In some embodiments, this reduced order model of the detailed hardware model is a low-order linear model obtained through reduction of the finite element model of the physical hardware. In some embodiments, the reduced order model is matched to the detailed hardware model using an H-infinity optimization of the reduced order model that minimizes the error between the detailed hardware model and the reduced order model. In other embodiments, other higher-order model matching techniques may be employed such as balanced truncation and proper orthogonal decomposition.

Various techniques may be used to form and solve the multi-objective optimization problem. For example, in some embodiments, the multi-objective optimization problem is a weighted sum of the first, the second, and the third objective function. For example, in one embodiment, the weighted sum applies a first weight value to the first objective function and a second weight value to the second objective function and a third weight value to the third objective function. The weight values may be determined, for example, based on the set of user requirements. In some embodiments, the user can specify the weight values interactively. For example, in one embodiment, the design tool implementing the optimization method is presented in a GUI. This GUI may provide sliders or other input elements that allow the user to change the weighting values and view the effects on the product design.

In other embodiments, the multi-objective optimization problem is solved for all three objective functions independently and a Pareto front is computed based on this. The Pareto front describes all optimal designs where any of the three objective functions can only be improved by simultaneously degrading at least one of the other two objective functions. Then, the Pareto front can be presented to the user in a GUI and the user can browse through the different designs on the Pareto front.

In other embodiments, the multi-objective optimization problem is solved by first determining an ideal solution to the first objective function and an ideal solution to the second objective function by optimizing each objective function independently. In one embodiment, the two objective functions are optimized in parallel. Once the ideal solutions are determined, the multi-objective optimization problem is solved using a weighted distance metric for each objective function comparing any potential solution to the ideal solution for the objective function.

Continuing with reference to FIG. 2, at step 220, the optimal design is outputted. In general, the "output," in this context means providing the optimal design to one or more subsequent stages of the product design process. For example, in some embodiments, the optimal design is output by presenting a visualization of the design in a GUI to the user. In other embodiments, the optimal design is converted into a format suitable for performing other design operations. For example, in one embodiment, a mapping between hardware elements and 3D printer instructions is used to generate a set of instructions for printing one or more components of the optimal design on a 3D printer. Once generated, these instructions can be used to print a prototype of the optimal design for testing purposes. Additionally, in some embodiments, the controller model may be converted automatically into controller code for a specialized microcontroller using code generation techniques generally known in the art.

Figure 3:
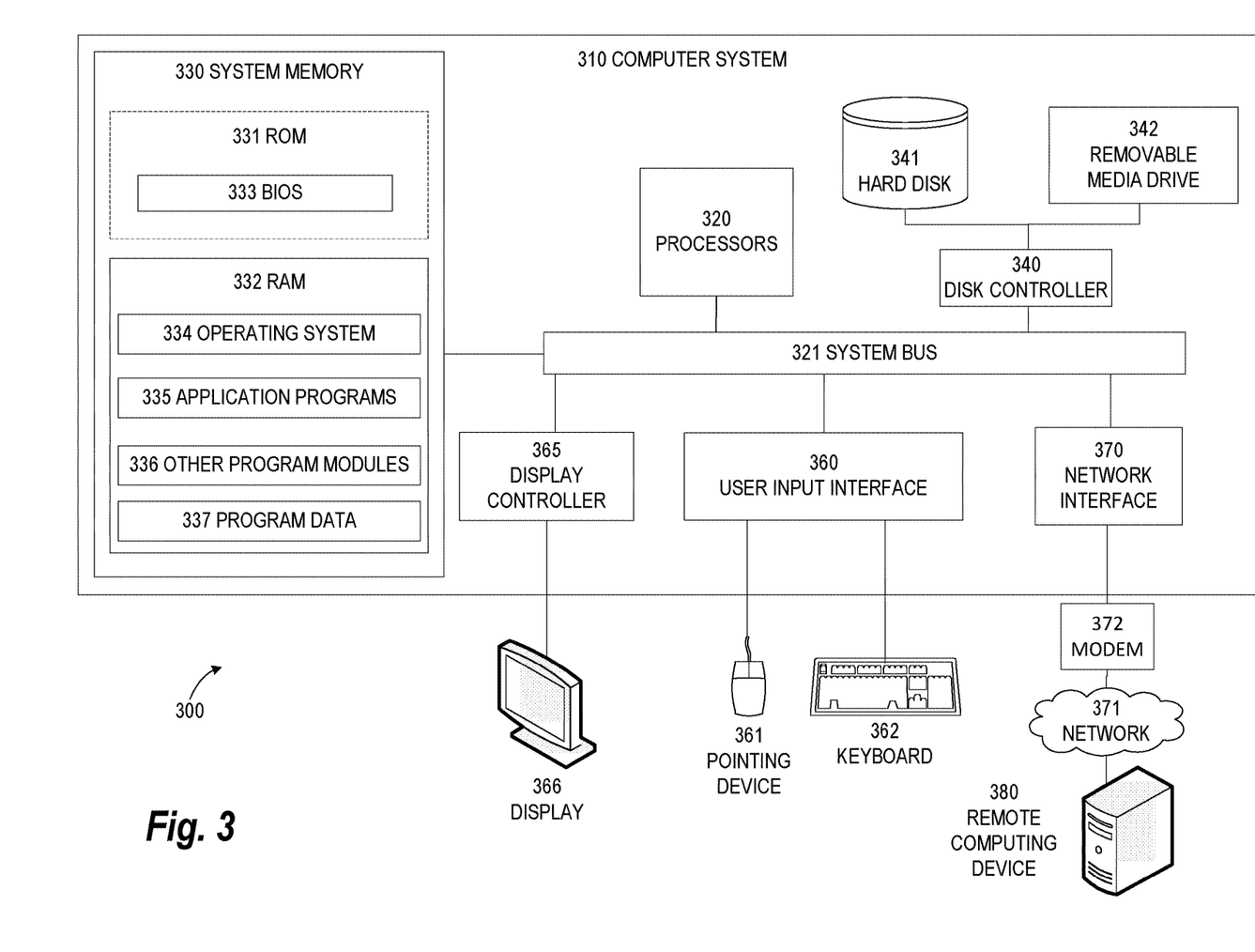
FIG. 3 illustrates an exemplary computing environment within which embodiments of the invention may be implemented.

FIG. 3 illustrates an exemplary computing environment 300 within which embodiments of the invention may be implemented. For example, the computing environment 300 may be used to implement one or more of the components illustrated in the system 100 of FIG. 1. The computing environment 300 may include computer system 310, which is one example of a computing system upon which embodiments of the invention may be implemented. Computers and computing environments, such as computer system 310 and computing environment 300, are known to those of skill in the art and thus are described briefly here.

As shown in FIG. 3, the computer system 310 may include a communication mechanism such as a system bus 321 or other communication mechanism for communicating information within the computer system 310. The computer system 310 further includes one or more processors 320 coupled with the system bus 321 for processing the information. The processors 320 may include one or more central processing units (CPUs), graphical processing units (GPUs), or any other processor known in the art.

The computer system 310 also includes a system memory 330 coupled to the system bus 321 for storing information and instructions to be executed by processors 320. During runtime, a portion of the system memory 330 may be used for implementing the storage medium 105 shown in FIG. 1. The system memory 330 may include computer readable storage media in the form of volatile and/or nonvolatile memory, such as read only memory (ROM) 331 and/or random access memory (RAM) 332. The system memory RAM 332 may include other dynamic storage device(s) (e.g., dynamic RAM, static RAM, and synchronous DRAM). The system memory ROM 331 may include other static storage device(s) (e.g., programmable ROM, erasable PROM, and electrically erasable PROM). In addition, the system memory 330 may be used for storing temporary variables or other intermediate information during the execution of instructions by the processors 320. A basic input/output system (BIOS) 333 containing the basic routines that help to transfer information between elements within computer system 310, such as during start-up, may be stored in ROM 331. RAM 332 may contain data and/or program modules that are immediately accessible to and/or presently being operated on by the processors 320. System memory 330 may additionally include, for example, operating system 334, application programs 335, other program modules 336 and program data 337. For example, the optimization module 115 shown in FIG. 1 may be included in the system memory 330, either as an application program 335 or one of the other program modules 336 executed by the processor(s).

The computer system 310 also includes a disk controller 340 coupled to the system bus 321 to control one or more storage devices for storing information and instructions, such as a hard disk 341 and a removable media drive 342 (e.g., floppy disk drive, compact disc drive, tape drive, and/or solid state drive). The storage devices may be added to the computer system 310 using an appropriate device interface (e.g., a small computer system interface (SCSI), integrated device electronics (IDE), Universal Serial Bus (USB), or FireWire).

The computer system 310 may also include a display controller 365 coupled to the system bus 321 to control a display 366, such as a cathode ray tube (CRT) or liquid crystal display (LCD), for displaying information to a computer user. The computer system includes a user input interface 360 and one or more input devices, such as a keyboard 362 and a pointing device 361, for interacting with a computer user and providing information to the processors 320. The pointing device 361, for example, may be a mouse, a trackball, or a pointing stick for communicating direction information and command selections to the processors 320 and for controlling cursor movement on the display 366. The display 366 may provide a touch screen interface which allows input to supplement or replace the communication of direction information and command selections by the pointing device 361.

The computer system 310 may perform a portion or all of the processing steps of embodiments of the invention in response to the processors 320 executing one or more sequences of one or more instructions contained in a memory, such as the system memory 330. Such instructions may be read into the system memory 330 from another computer readable medium, such as a hard disk 341 or a removable media drive 342. The hard disk 341 may contain one or more datastores and data files used by embodiments of the present invention. Datastore contents and data files may be encrypted to improve security. The processors 320 may also be employed in a multi-processing arrangement to execute the one or more sequences of instructions contained in system memory 330. In alternative embodiments, hard-wired circuitry may be used in place of or in combination with software instructions. Thus, embodiments are not limited to any specific combination of hardware circuitry and software.

As stated above, the computer system 310 may include at least one computer readable medium or memory for holding instructions programmed according to embodiments of the invention and for containing data structures, tables, records, or other data described herein. The term "computer readable medium" as used herein refers to any medium that participates in providing instructions to the processors 320 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 341 or removable media drive 342. Non-limiting examples of volatile media include dynamic memory, such as system memory 330. Non-limiting examples of transmission media include coaxial cables, copper wire, and fiber optics, including the wires that make up the system bus 321. Transmission media may also take the form of acoustic or light waves, such as those generated during radio wave and infrared data communications.

The computing environment 300 may further include the computer system 310 operating in a networked environment using logical connections to one or more remote computers, such as remote computing device 380. Remote computing device 380 may be a personal computer (laptop or desktop), a mobile device, a server, a router, a network PC, a peer device or other common network node, and typically includes many or all of the elements described above relative to computer system 310. When used in a networking environment, computer system 310 may include modem 372 for establishing communications over a network 371, such as the Internet. Modem 372 may be connected to system bus 321 via user network interface 370, or via another appropriate mechanism.

Network 371 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 310 and other computers (e.g., remote computer 380). The network 371 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 371.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A system for designing a product comprising physical hardware and a controller for controlling the physical hardware, wherein the system comprises:
    a computer-readable medium comprising a detailed hardware model corresponding to the physical hardware and a controller model corresponding to the controller;
    a receiver module configured to receive one or more user requirements via a user input device;
    an optimization module configured to jointly optimize the detailed hardware model and the controller model over a plurality of iterations, wherein each iteration comprises (i) optimizing of the detailed hardware model with respect to the one or more user requirements; (ii) matching the detailed hardware model to a reduced order model of the detailed hardware model; and (iii) optimizing the controller model with respect to the reduced order model of the detailed hardware model.

2. The system of claim 1, wherein the optimization module jointly optimizes the detailed hardware model and the controller model using a process comprising:
    determining an optimal design of the physical hardware and the controller by solving a multi-objective optimization problem comprising:
        a first objective function defining hardware design objectives,
        a second objective function defining objectives for the controller model for the physical hardware, and
        a third objective function that minimizes the differences between the reduced order model of the detailed hardware model and the detailed hardware model.

3. The system of claim 2, wherein the detailed hardware model is a finite element model of the physical hardware.

4. The system of claim 3, wherein the reduced order model of the detailed hardware model is a low-order linear model obtained through reduction of the finite element model of the physical hardware.

5. A method for designing a product comprising physical hardware and a controller for controlling the physical hardware, wherein the method comprises:
    generating a detailed hardware model corresponding to the physical hardware and a controller model corresponding to the controller;
    receiving one or more user requirements via a user input device;
    jointly optimizing the detailed hardware model and the controller over a plurality of iterations, wherein each iteration comprises (i) optimizing of the detailed hardware model with respect to one or more user requirements; (ii) matching of the detailed hardware model to a reduced order model of the detailed hardware model; and (iii) optimizing the controller model with respect to the reduced order model of the detailed hardware model.

6. The method of claim 5, wherein the optimization module jointly optimizes the detailed hardware model and the controller model using a process comprising:
    determining an optimal design of the physical hardware and the controller by solving a multi-objective optimization problem comprising:
        a first objective function defining hardware design objectives,
        a second objective function defining objectives for the controller model for the physical hardware, and a third objective function that minimizes the differences between the reduced order model of the detailed hardware model and the detailed hardware model.

7. The method of claim 6, wherein the detailed hardware model is a finite element model of the physical hardware.

8. The method of claim 7, wherein the reduced order model of the detailed hardware model is a low-order linear model obtained through reduction of the finite element model of the physical hardware.

9. The method of claim 5, wherein generating the detailed hardware model comprises:
using an optimization of the reduced order model is used to minimize an error between the detailed hardware model and the reduced order model.

* * * * *